US008307520B2

(12) United States Patent
Li

(10) Patent No.: US 8,307,520 B2
(45) Date of Patent: Nov. 13, 2012

(54) HINGE WITHOUT SHAFT AND METHOD FOR PRODUCING THE SAME

(76) Inventor: Junwei Li, Guangdong (CN)

( * ) Notice: Subject to any disclaimer, the term of this patent is extended or adjusted under 35 U.S.C. 154(b) by 103 days.

(21) Appl. No.: 12/989,651

(22) PCT Filed: Nov. 5, 2008

(86) PCT No.: PCT/CN2008/072947

§ 371 (c)(1),
(2), (4) Date: Oct. 26, 2010

(87) PCT Pub. No.: WO2009/132498

PCT Pub. Date: Nov. 5, 2009

(65) Prior Publication Data

US 2011/0094060 A1 Apr. 28, 2011

(30) Foreign Application Priority Data

Apr. 29, 2008 (CN) .......................... 2008 1 0027774

(51) Int. Cl.
*B21D 53/40* (2006.01)
*B23P 13/04* (2006.01)

(52) U.S. Cl. ................................. 29/11; 29/558; 16/387

(58) Field of Classification Search .............. 29/11, 557, 29/558; 16/387
See application file for complete search history.

(56) References Cited

U.S. PATENT DOCUMENTS

| | | | | |
|---|---|---|---|---|
| 389,508 | A * | 9/1888 | Hart | 29/11 |
| 481,207 | A * | 8/1892 | Smith | 428/595 |
| 611,714 | A * | 10/1898 | Smith | 29/11 |
| 3,472,549 | A * | 10/1969 | Wiesmann | 296/97.9 |
| 5,797,173 | A * | 8/1998 | Wagner | 29/11 |
| 6,637,096 | B2 * | 10/2003 | Kang | 29/527.2 |

* cited by examiner

*Primary Examiner* — Alexander P Taousakis

(57) ABSTRACT

The present invention relates to a shaftless hinge comprising two hinge plates where shaft bushes are disposed on confronting sides of the two hinge plates; each of the shaft bushes on one of the hinge plates is disposed with an extension section at one end thereof; the extension section inserts into and pivotally articulated with one of the shaft bushes of an other one of the hinge plates respectively. The present invention also relates to a manufacturing method of the shaftless hinge, comprising the following steps: (1) Form blanks of two hinge plates on a flat strip material by punching, where shaft bush sections with projections are formed on one of them and shaft bush sections are formed on an other one; (2) Curl the shaft bush sections of one hinge plate first to form shaft bushes with extension sections and the extension sections are formed from the projections in Step (1); fold the two hinge plates towards each other so that the substantially cylindrical extension sections of the curled shaft bushes are positioned towards the shaft bush sections on the other hinge plate; (3) Curl the shaft bush sections of the other hinge plate so that shaft bushes are formed; the shaft bushes enclose the extension sections in Step (2). The present invention has simple and reasonable structure and is safe and reliable to use. The manufacturing process of the present invention is simple with high processing accuracy and low costs.

3 Claims, 7 Drawing Sheets

HINGE WITHOUT SHAFT AND METHOD FOR PRODUCING THE SAME

BACKGROUND OF THE INVENTION

The present invention relates to hinges and more particularly pertains to a shaftless hinge and its manufacturing method.

Hinges serve as an intermediate member to movably articulate a connecting piece with another. They have wide spectrum of usage, such as to connect doors, windows, cabinets, boxes and others.

At present, there are various types of hinges. FIG. 1 shows the hinge structure of one typical type. It comprises two hinge plates 1; two or more shaft bushes 2 are disposed on the confronting sides of the two hinge plates 1; the plurality of shaft bushes 2 of the two hinge plates 1 are coaxially disposed and alternate with each other; by inserting a shaft 3 through the shaft bushes 2, the two hinge plates 2 are movably articulated; shaft caps are generally disposed at the two ends of the shaft 3 to secure the shaft in the shaft bushes; this type of hinge has simple structure and is easy to use and install and has high applicability, but it also has obvious disadvantages: (1) The shaft 3 and the hinge plates 1 are independent components. The shaft caps at the ends of the shaft 3 may fall off due to abrasion and rusting with passage of time. The shaft is also easy to fall off and therefore affect the usage of the hinge and even cause accidents; (2) The contact surfaces of the exterior surface of the shaft 3 and the interior surface of the shaft bushes 2 may be abraded and rusted, forming an oxidizing layer. The oxidizing layer will fall off with the vibration and movement of the hinge and the diameter of the shaft 3 gradually reduces. This widens the gap between the shaft 3 and the shaft bushes 2 so that radial displacement occurs between the shaft bushes 2 and the shaft 3. This affects the rotation of the hinge and the operation of the product; (3) The manufacturing of conventional shaft hinges must include a riveting procedure and the manufacturing process is relatively complex and the manufacturing costs are therefore increased; (4) The manufacturing of conventional hinges generally requires manual assembling after the shaft 3 and the hinge plates 1 are produced (i.e. to align the two hinge plates 1 and insert the shaft 3 into the shaft bushes 2 of the hinge plates 1. The assembling process is relatively complex, leading to low production efficiency and increased costs.

U.S. Pat. No. 5,127,132A discloses a "Hinge made from identical hinge plates". This hinge does not have a complete shaft. The two hinge plates have identical structure comprising four hollow coaxially disposed tubular barrels, two of which are disposed with coaxial bores and the other two are disposed with cylindrical projections at their ends. When the two hinge plates are assembled, the two cylindrical projections of one hinge plate are inserted into the coaxial bores of the other hinge plate, forming an articulated hinge. This hinge is substantially a shaftless hinge and can overcome the disadvantages of conventional hinges with shafts. However, it also has obvious shortcomings: Since tubular barrels with cylindrical projections and tabular barrels with bores have to be manufactured to each hinge plate, the structure of the hinge is relative complex and processing and assembling are quite complicated and inconvenient.

BRIEF SUMMARY OF THE INVENTION

In view of the aforesaid disadvantages now present in the prior art, the present invention provides a shaftless hinge with simple and reasonable structure, which is safe and reliable to use and durable, and which can replace conventional hinge products.

Another object of the present invention is to provide a manufacturing method of the shaftless hinge with simple procedures, quick assembling and high manufacturing efficiency.

To attain this, the present invention generally comprises a shaftless hinge comprising two hinge plates, where shaft bushes are disposed on the confronting sides of the two hinge plates; all shaft bushes on one of the hinge plates are each disposed with an extension section at one end thereof; the extension sections insert into and pivotally articulated with the shaft bushes on an other one of the hinge plates respectively. Since only one structural type is needed for each hinge plate (i.e. one type with shaft bushes only and the other type with shaft bushes with extension sections only), machining of mixed-typed hinge plates is not required. In comparison to U.S. Pat. No. 5,127,132A, therefore, the present invention has simpler structure and is more convenient and less expensive to manufacture.

The extension section of the hinge plate is formed by two or more than two, preferably two to four, arc-shaped sections. The two or more than two arc-shaped sections are coaxially disposed, forming the extension section of substantially cylindrical shape.

Gaps are provided between the two or more than two arc-shaped sections. The radial size of the extension section can be self-adjusted by means of the gaps and thereby attaining flexibility and maintaining a suitable tightness between the extension section and the shaft bush on the other one of the hinge plates.

The confronting sides of the two hinge plates are also disposed with limiting members interlocking with each other. The degree of opening of the two hinge plates relative to each other can be limited to less than or equal to a predetermined value by the limiting members. The predetermined value is usually 180°, 90°, 60°, 45°, 30°, 15° or other values, depending of the actual requirements.

The extension section disposed at the end of the shaft bush and the shaft bush can be integrally formed or removably and fixedly connected to each other, such as by means of a fixed snap connection. The former is simple and convenient to assemble and has high connection strength. The latter is convenient for replacement of worn out or damaged extension sections, thereby lengthening the usage span.

There can be two or more than two shaft bushes on the other one of the hinge plates. Correspondingly, there can be two or more than two shaft bushes with extension sections on the one of the hinge plates. In preferred embodiments, there are two to four shaft bushes.

The present shaftless hinge does not require a separate rotating shaft to attain articulation. However, a fixation shaft can be disposed in the hollow extension section of the present shaftless hinge to strengthen the connection and enhance reliability.

A manufacturing method of the present shaftless hinge, comprising the following steps:

(1) Form blanks of two hinge plates on a flat strip material by punching, where shaft bush sections with projections are formed on one side of the blank of one of the hinge plates and shaft bush sections are formed on one side of the blank of an other one of the hinge plates;

(2) Curl the shaft bush sections on the other one of the hinge plates first to form shaft bushes and each of the shaft bushes has an extension section of substantially cylindrical shape; the extension section is formed from the projections in Step (1) and the extension section has an outer diameter of d; fold the two hinge plates towards each other so that the substantially cylindrical extension sections of the curled shaft bushes are positioned near to the shaft bush sections on the other one of the hinge plates respectively;

(3) Curl the shaft bush sections on the other one of the hinge plates so that shaft bushes are formed; each of the shaft bushes has an inner diameter of D and D≧d, and the shaft bush also encloses the extension section of substantially cylindrical shape in Step (2).

In Step (1), the number of projections is two or more than two, preferably two to four.

In Step (2), the curling process of the shaft bushes with extension sections of substantially cylindrical shape can be: form a tapering section at roots of the projections of Step (1) and curl the shaft bush sections and the projections, so that the shaft bushes with extension sections of substantially cylindrical shape are formed and the extension sections have smaller outer diameters than the shaft bushes (the difference in the outer diameters is caused by the tapering section).

In Step (2), the curling process of the shaft bush with extension section of substantially cylindrical shape can also be: curl the shaft bush sections and the projections, and the formed shaft bushes and the extension sections have identical outer diameters; then form a tapering section at roots of the projections, so that the extension sections have smaller outer diameters than the shaft bushes.

To facilitate the processing of the tapering sections and avoid stress concentration, arc-shaped notches can be formed at the roots of the projections.

The present invention has the following advantages in comparison to the prior art:

(1) Since the present invention can attain hinge articulation by registering one shaft bush and the extension section of the other shaft bush, the need for a shaft is eliminated. The problem of falling off of shafts in conventional hinges will never arise. The present invention has the advantages of simple and reasonable structure and is safe and reliable to use.

(2) Since the extension section, which serves as the "shaft", of the shaft bush of the present shaftless hinge comprises at least two or more than two arc-shaped sections and gaps are provided between the arc-shaped sections, the extension sections can be self-adjusted by means of the gaps and flexibility is attained. The tightness between the extension section and the shaft bush of the other hinge plate can be kept suitable. The hinge therefore will not loosen even after long-time usage, and the two hinge plates can be kept at a certain angle in respect of each other without closing up or opening wide by itself. The present invention is especially suitable for products which require the two hinge plates to be kept at a certain angle in respect of each other for a long time, such as in photo frames. Conventional hinge plates obviously do not possess this feature.

(3) The present manufacturing method of shaftless hinge does not require installation or fixation of shafts, thereby saving the shaft assembling procedure and the riveting procedure. The manufacturing process is greatly simplified and can be completed with an automatic production line. Manufacturing efficiency is highly increased and processing costs are greatly reduced, thereby attaining high economic efficiency.

(4) Since the manufacturing of the shaftless hinge can be completed with an automatic production line, the manufactured shaftless hinges have high consistency, stable quality and high processing accuracy.

(5) The present shaftless hinge is fully compatible with products where conventional hinges are applied onto and can be a replacement of conventional hinges. It has high adaptability and wide usage spectrum.

DETAILED DESCRIPTION OF THE INVENTION

The present invention is further illustrated by reference to the following embodiments and accompanying drawings, which should not be construed as limiting the scope of the present invention in any way.

Embodiment 1

Figure 1:
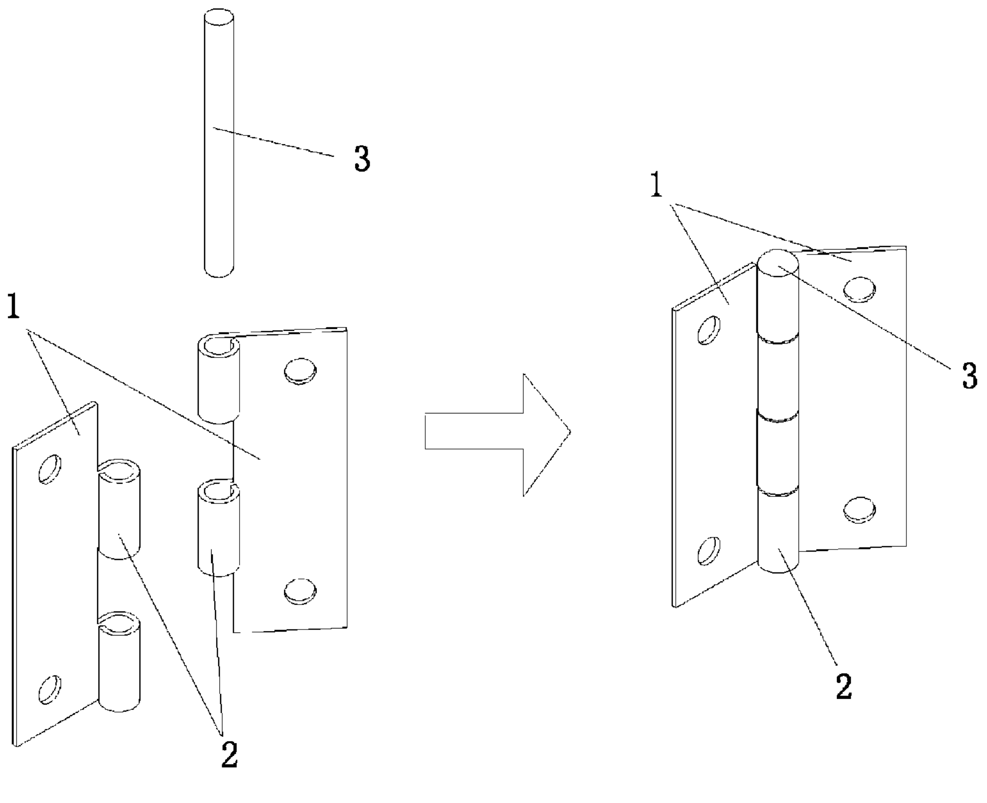
FIG.1 (PRIOR ART)
FIG. 1 is a structural view of a conventional hinge with shaft.
Figure 2:
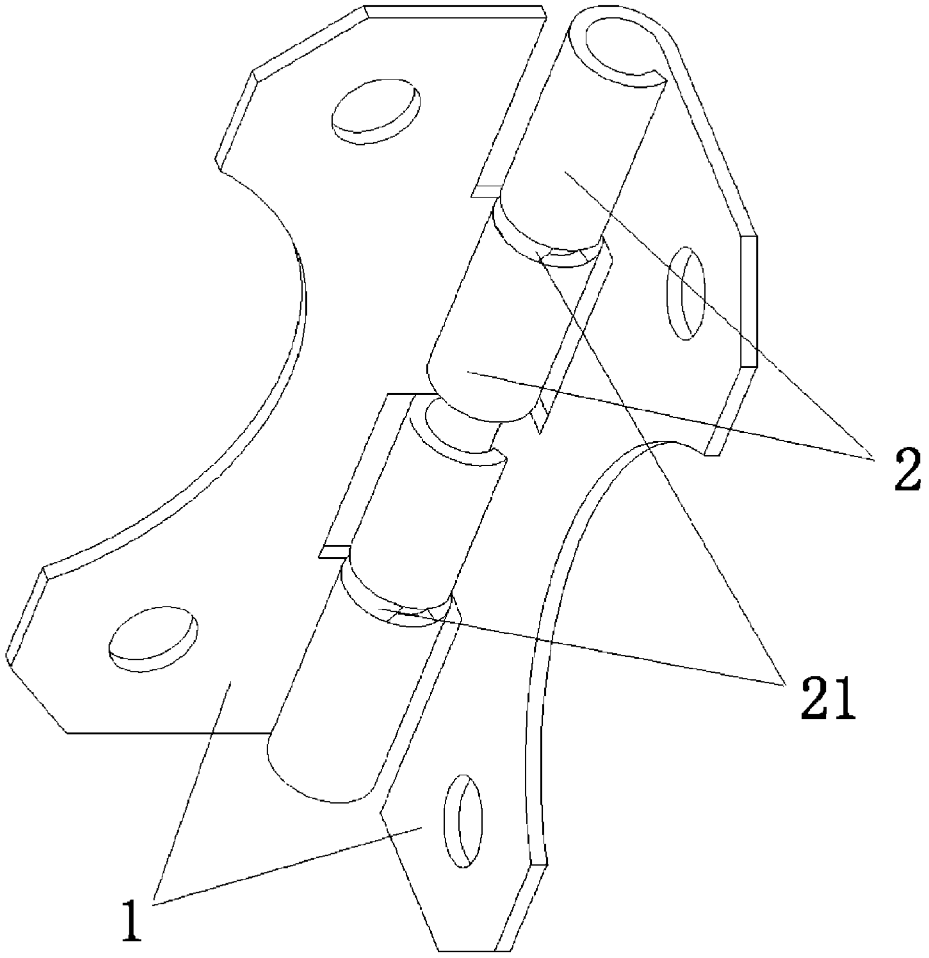
FIG. 2 is a structural view of a shaftless hinge of the present invention.
Figure 3:
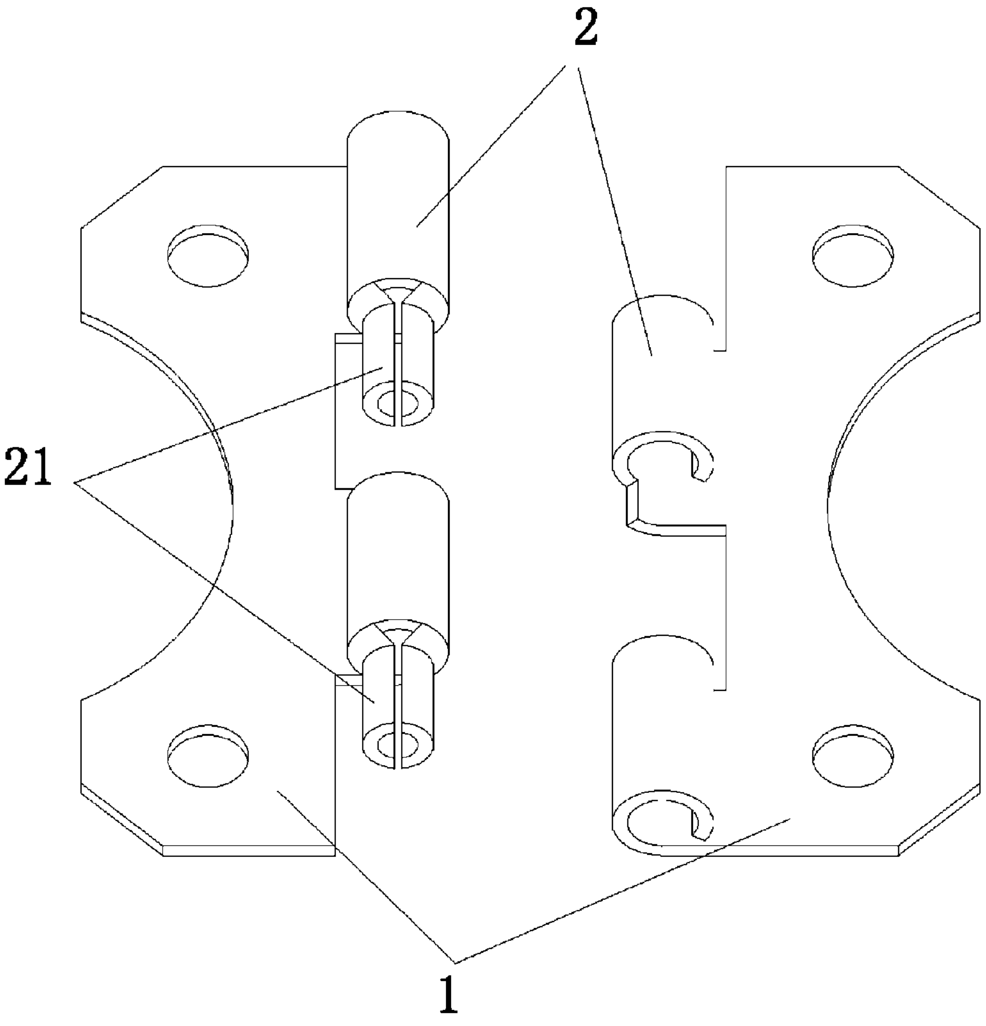
FIG. 3 is an exploded view of the shaftless hinge of FIG. 2.

FIG. 2 and FIG. 3 show the structure of one embodiment of the present invention. As illustrated in FIG. 2, the present shaftless hinge comprises two hinge plates 1, where shaft bushes 2 are disposed on the confronting sides of the two hinge plates 1; each of the shaft bushes 2 on one of the hinge plates 1 is disposed with an extension section 21 at one end thereof; the extension section 21 inserts into one of the shaft bushes 2 on an other one of the hinge plates 1, so that the extension section 21 is rotatably received in the shaft bush 2. The extension section 21 of the hinge plate 1 is formed by two arc-shaped sections. As illustrated in FIG. 3, the two arc-shaped sections are coaxially disposed, forming the extension section 21 of substantially cylindrical shape. Gaps are provided between the two arc-shaped sections. The radial size of the extension section 21 can be self-adjusted by means of the gaps and thereby attaining flexibility and maintaining a suitable tightness between the extension section 21 and the shaft bush 2 on the other one of the hinge plates 1. The extension section 21 disposed at the end of the shaft bush 2 and the shaft bush 2 are integrally formed, thereby having the advantages of being simple and convenient to assemble and ensuring high connection strength.

Figure 4:
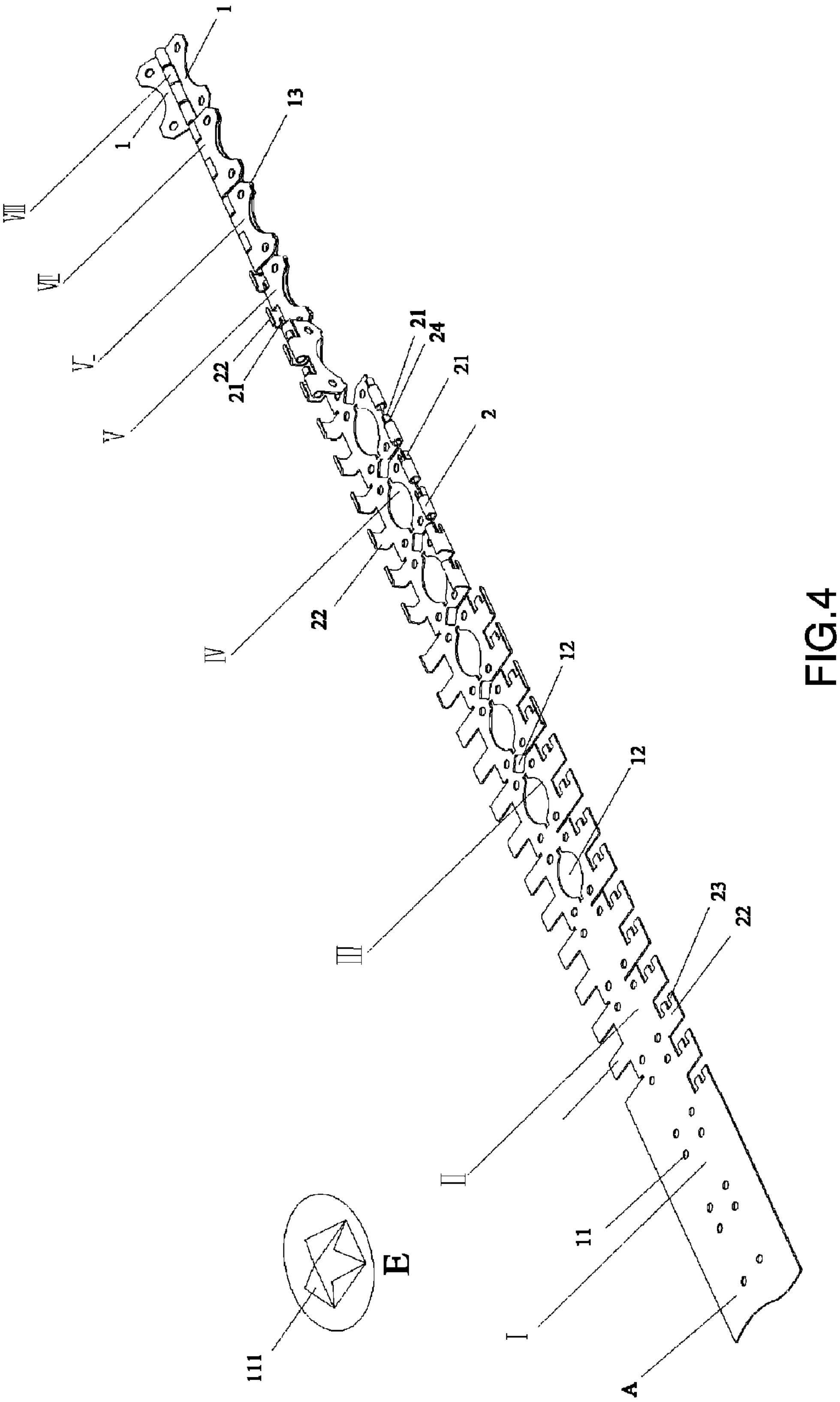
FIG. 4 shows the manufacturing process of the shaftless hinge of FIG. 2, where E shows the partial enlargement view of the strip material A.

FIG. 4 shows the manufacturing process of the present shaftless hinge. As illustrated in FIG. 4, the manufacturing steps are as follows:

(1) Choose a strip material A. The strip material A can be made from metals such as copper, steel, iron or aluminum. The area and thickness of the strip material A can be determined by the size and requirements of the shaftless hinge plate 1. Form installation holes 11 (see I in FIG. 4) at appropriate positions on the strip material A by punching according to the usage requirement of the hinge plate 1. The installation holes 11 can be flat holes (as on the strip material A in FIG. 4) or installation holes with sharp flanges 111 (as in enlarged view E in FIG. 4). The sharp flanges 111 can comprise two to four sharp edges. Installation holes with sharp flanges 111 are usually applied onto products such as photo frames. The sharp flanges 111 easily insert into the photo frame board, thereby attaining fixed connection between the hinge plates 1 and the photo frame board.

(2) Form on one side of the strip material A shaft bush sections 22 each with two projections 23 by punching for the formation of shaft bushes 2 with extension sections 21, and form on an other one side of the strip material A shaft bush sections 22 by punching for the formation of shaft bushes 2.

(3) Form shearing holes 12 for separating two hinge plates 2 at the middle of the blanks of two hinge plates on the strip material A (see III in FIG. 4). The shape of the shearing holes 12 can be determined according to the shape requirement of the hinge plates 1. It can be of shapes such as ellipse, triangle or rhombus. Various shapes can be used as long as the appearance of the two hinge plates 1 is good and that it is favorable for separation of the two hinge plates 1 at a later stage of the process.

(4) Pre-curl the shaft bush sections 22 on the other one side of the strip material A to a certain degree. Curl the shaft bush sections 22 each with two projections 23 on the one side as a whole to form a substantially cylindrical shape; the two projections 23 of each shaft bush section 22 form arc-shaped sections (see IV in FIG. 4). At this point, the outer diameters of the formed shaft bushes 2 and the extension sections 21 are identical. A tapering section 24 is then formed at roots of the projections 23 so that the outer diameters of the extension sections 21 are smaller than the outer diameters of the shaft bushes 2, forming the extension sections 21 of substantially cylindrical shape of smaller outer diameters (see IV in FIG. 4). Before curling into a substantially cylindrical shape as mentioned above, to facilitate the forming of the tapering sections 24 and avoid stress concentration, arc-shaped notches can be formed at the roots of the projections 23 before the projections 23 are processed to form the tapering sections 24.

(5) Fold the two hinge plates 1 along the symmetrical line of the shearing holes 12 (see V in FIG. 4). The extension section 21 of the hinge plate 1 is now inside the pre-curled shaft bush section 22 of the hinge plate 1 in Step (4). Continue to curl the pre-curled shaft bush section 22 along the original curling direction and enclose the extension section 21 inside, forming pivotal articulation (see VI in FIG. 4).

(6) Cut the connection edges 13 remaining on the symmetrical line on the two hinge plates 1 (see VII in FIG. 4). Separate the two hinge plates 1 to form an articulated hinge structure (see VIII I FIG. 4). The manufacturing process of the shaftless hinge is complete.

The manufacturing process of the present shaftless hinge is completed by automatic progressive die punching and is completed with an automatic production line. Manufacturing efficiency and processing accuracy are enhanced and rejection rate is greatly reduced. The present invention overcomes the problems of high rejection rate of conventional hinges manufactured by crawl punching and the requirement for manual assembling.

Embodiment 2

Figure 5:
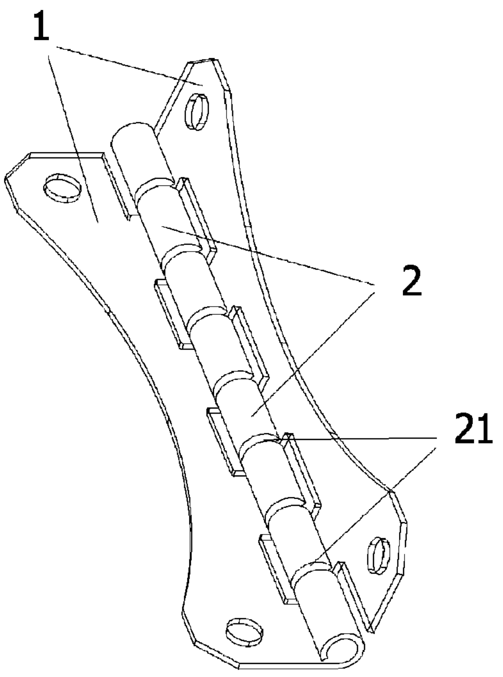
FIG. 5 is a structural view of another shaftless hinge of the present invention.
Figure 6:
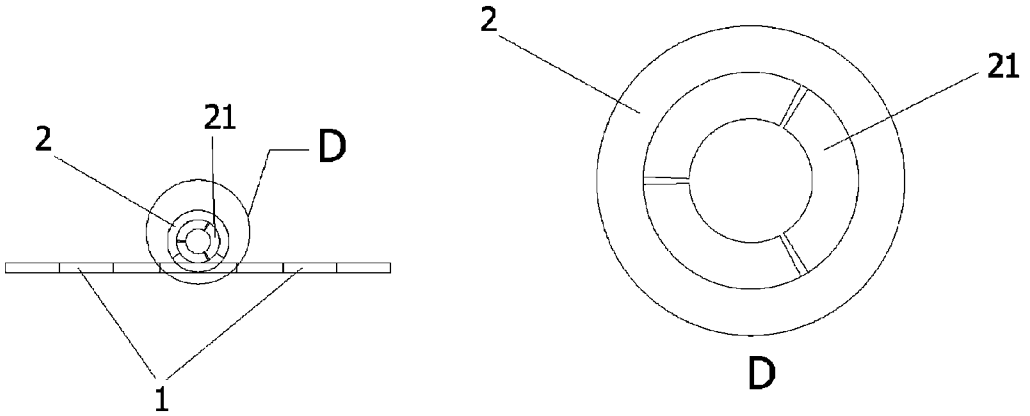
FIG. 6 is an end view of the shaftless hinge of FIG. 5.

FIG. 5 and FIG. 6 show the structure of another embodiment of the present invention. As illustrated in FIG. 5, the present shaftless hinge has the same structure as in the first embodiment except for the following: the number of the shaft bushes 2 on the hinge plate 1 is four; correspondingly, the number of the shaft bushes 2 and the extension sections 21 on the other hinge plate 1 is also four; the four shaft bushes 2 on the two hinge plates 1 are connected to the corresponding extension sections 21, forming the articulated shaftless hinge. As illustrated in FIG. 6, the extension section 21 of the shaft bush 2 of the hinge plate 1 is formed by three arc-shaped sections. As illustrated in FIG. 6, the three arc-shaped sections are coaxially disposed, forming the extension section 21 of substantially cylindrical shape.

The manufacturing process of the present shaftless hinge has the same steps as in the first embodiment except for the following: the curling process of the shaft bushes 2 with extension sections 21 of substantially cylindrical shape can be: form a tapering section 24 at roots of the projections 23; then curl the shaft bush sections 22 and the projections 23 to form the shaft bushes 2 with extension sections 21 of substantially cylindrical shape; the outer diameters of the extension sections 21 are smaller than the outer diameters of the shaft bushes 2 (the difference in the outer diameters is caused by the tapering section 24).

Embodiment 3

Figure 7:
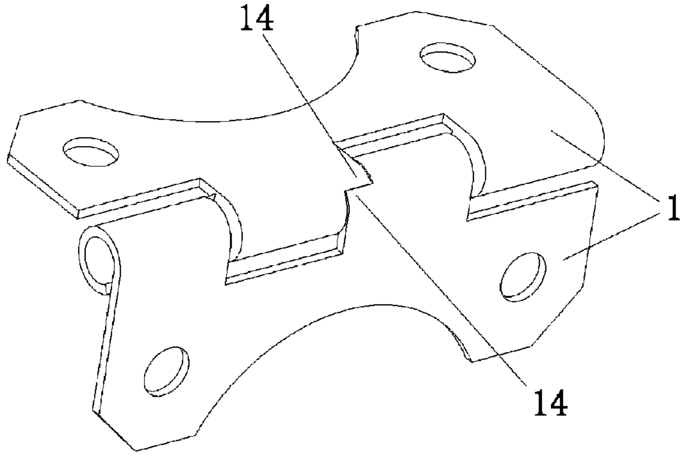
FIG. 7 is a structural view of yet another shaftless hinge of the present invention.

FIG. 7 shows the structure of yet another embodiment of the present invention. As illustrated in FIG. 7, the present shaftless hinge has the same structure as in the first embodiment except for the following: the confronting sides of the two hinge plates 1 are disposed with limiting members 14 interlocking with each other; the degree of opening of the two hinge plates 1 relative to each other are limited to less than 90° by the limiting members 14. This embodiment can be used for products whose degree of opening of the hinge relative to each other cannot exceed 90°.

Embodiment 4

Figure 8:
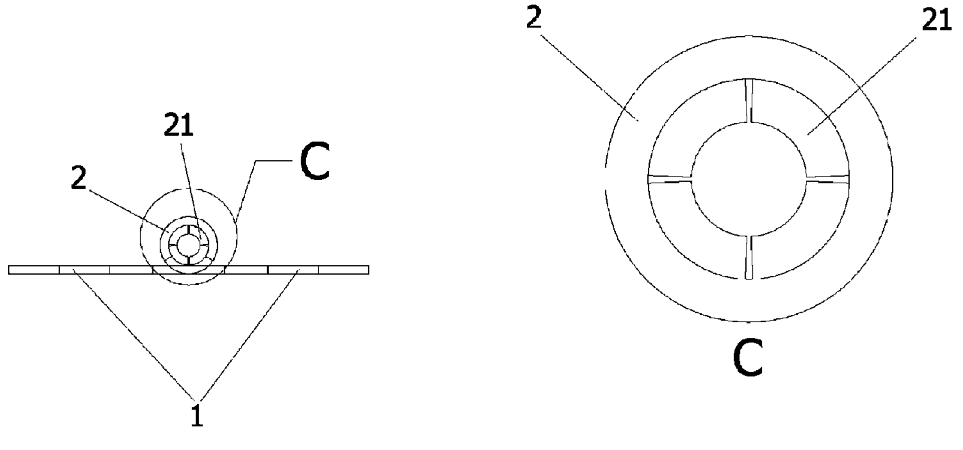
FIG. 8 is a structural view of yet another shaftless hinge of the present invention.

FIG. 8 shows the structure of yet another embodiment of the present invention. As illustrated in FIG. 8, the present shaftless hinge has the same structure as in the second embodiment except for the following: the extension section 21 of the shaft bush 2 of the hinge plate 1 is formed by four arc-shaped sections; the four arc-shaped sections are coaxially disposed, forming the extension section 21 of substantially cylindrical shape.

Embodiment 5

Figure 9:
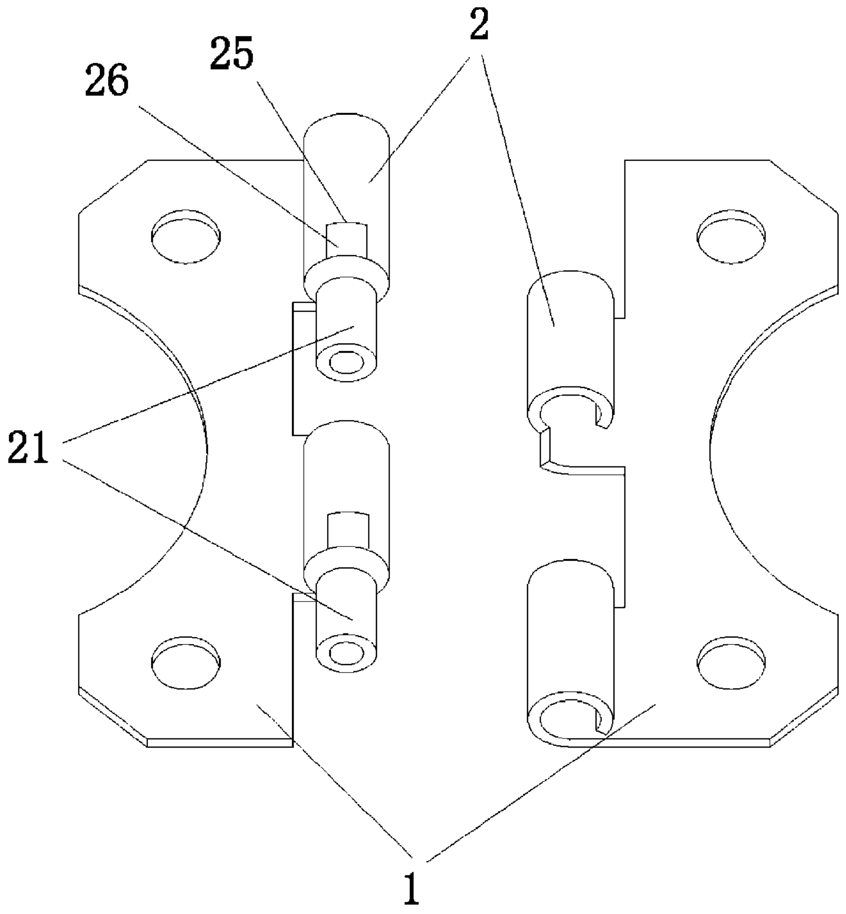
FIG. 9 is a structural view of the fifth embodiment of the shaftless hinge of the present invention.

FIG. 9 shows the fifth structure of the present invention. As illustrated in FIG. 9, the present shaftless hinge has the same structure as in the first embodiment except for the following: the extension section 21 disposed at the end of the shaft bush 2 are removably and fixedly connected to the shaft bush 2; the shaft bush 2 and the extension section 21 are two separate parts; an indentation 25 is disposed at the connection end of the shaft bush 2; a tab 26 is disposed at the connection end of the extension section 21; with the tab 26 being received in the indentation 25, the shaft bush 2 and the extension section 21 are fixedly connected. When the extension section 21 is worn out or damaged, the extension section 21 can be removed and replaced, thereby greatly increasing the usage life span of the hinge.

The above embodiments are preferred embodiments of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A manufacturing method of a shaftless hinge, which is characterized in that it comprises the following steps:

(1) punching a flat strip material to form a plurality of blanks, each of said blanks comprises two hinge plates, wherein a first hinge plate is located on a first side of each blank and a second hinge plate is located on a second side of each blank, and then punching the flat strip material to form shaft bush sections with projections on the first hinge plates and thereafter punching the flat strip material to form shaft bush sections without projections on the second hinge plates;

(2) curling the shaft bush sections with projections on the first hinge plates first to form shaft bushes whereupon each of the shaft bushes has an extension section formed by the projections and having a substantially cylindrical shape and an outer diameter of d; and then folding the first and the second hinge plates of each blank towards each other so that the substantially cylindrical extension sections of the curled shaft bushes on the first hinge plates are positioned near to the respective shaft bush sections without projections on the second hinge plates;

(3) curling the shaft bush sections without projections on the second hinge plates so that shaft bushes are formed; each of the shaft bushes formed by the shaft bush sections without projections has an inner diameter of D and $D \geqq d$; and the shaft bushes on the second hinge plates also encloses the respective extension sections of substantially cylindrical shape in Step (2).

2. The manufacturing method of a shaftless hinge as in claim 1, characterized in that in Step (1) of claim 1, the number of projections of each shaft bush section with projections is two or more than two; in Step (2) of claim 1, the curling process of the shaft bushes with extension sections of substantially cylindrical shape is: forming tapering sections at roots of the projections and then curling the shaft bush sections with the projection.

3. The manufacturing method of a shaftless hinge as in claim 1, characterized in that it comprises the following steps:

(1) choosing a strip material as the flat strip material and determining area and thickness of the flat strip material according to size of the blanks and the hinge plates to be made; then punching the flat strip material to form flat installation holes or installation holes with sharp flanges;

(2) punching the flat strip material to form the blanks each comprising the first hinge plate located on the first side of each blank and the second hinge plate located on the second side of blank, and then punching the flat strip material to form the shaft bush sections with projections on the first hinge plates and thereafter punching the flat strip material to form the shaft bush sections without projections on the second hinge plates;

(3) forming shearing holes for separating the first and the second hinge plates at middle of each blank; the shearing holes have shapes determined according to shape requirement of the hinge plates;

(4) pre-curling the shaft bush sections without projections on the second hinge plates to a certain degree; and then curling the shaft bush sections with projections on first hinge plates to form shaft bushes each having a substantially cylindrical shape whereupon the projections form arc-shaped extension sections; then forming a tapering sections at roots of the projections so that the arc-shaped extension sections have smaller outer diameters than the shaft bushes, thus forming the extension sections of substantially cylindrical shape of smaller outer diameters;

(5) folding the first and the second hinge plates of each blank along a symmetrical line of the shearing whereupon the extension sections of the shaft bushes formed by the shaft bush sections with projections on the first hinge plates are now inside the pre-curled shaft bush sections without projections; resume curling the pre-curled shaft bush sections without projections along original curling direction and enclose the extension sections inside, thus forming pivotal articulation;

(6) cutting connection edges remaining on the symmetrical line of the shearing holes at the middle of each blank for separating the first and the second hinge plates of each blank; and then separating the two hinge plates of each blank to form an articulated hinge structure; thus completing the manufacturing process of the shaftless hinge.

* * * * *